(12) United States Patent
Ford

(10) Patent No.: US 6,389,889 B1
(45) Date of Patent: May 21, 2002

(54) METHODS OF AND APPARATUS FOR IDENTIFYING FAULTS IN INTERNAL COMBUSTION ENGINE COOLING SYSTEMS

(76) Inventor: Curtis A. Ford, 5475 Kings Hwy., #1, Brooklyn, NY (US) 11203

( * ) Notice: Subject to any disclaimer, the term of this patent is extended or adjusted under 35 U.S.C. 154(b) by 0 days.

(21) Appl. No.: 09/314,305

(22) Filed: May 19, 1999

(51) Int. Cl.[7] .............................................. G01M 15/00
(52) U.S. Cl. ...................................................... 73/118.1
(58) Field of Search ............................... 73/116, 117.2, 73/117.3, 118.1, 119 R

(56) References Cited

U.S. PATENT DOCUMENTS

| | | | | | |
|---|---|---|---|---|---|
| 2,018,403 A | * | 10/1935 | Hussar | ....................... | 73/118.1 |
| 4,682,493 A | * | 7/1987 | Tenenbaum | ................ | 73/118.1 |
| 4,702,620 A | * | 10/1987 | Ford | | |
| 5,521,581 A | * | 5/1996 | Proulx | | |
| 5,526,871 A | * | 6/1996 | Musser et al. | ............. | 73/117.3 |
| 5,571,420 A | * | 11/1996 | Creeron et al. | | |
| 5,656,771 A | * | 8/1997 | Beswick et al. | ........... | 73/118.1 |

* cited by examiner

Primary Examiner—Eric S. McCall
(74) Attorney, Agent, or Firm—Millen, White, Zelano & Branigan, P.C.

(57) ABSTRACT

Methods of and apparatus for identifying faults in cooling systems of internal combustion engines include a first temperature sensor clamped to the top radiator hose and a second temperature sensor clamped to the bottom radiator hose. The first temperature sensor is connected to a first array of linear amplifiers, each of which has an output indicative of a selected temperature level detected in the first radiator hose. The second sensor is connected to a second array of linear amplifiers, each of which has an output indicative of a selected temperature level in the second radiator hose. Each of the linear amplifiers is connected through a collator to logic circuitry, which logic circuitry also has inputs from a timing circuit. The logic circuitry has outputs which energizes indicators, such as an indicator lamps, when the temperature/time condition of the engine is within selected ranges indicative of selected cooling system faults.

17 Claims, 14 Drawing Sheets

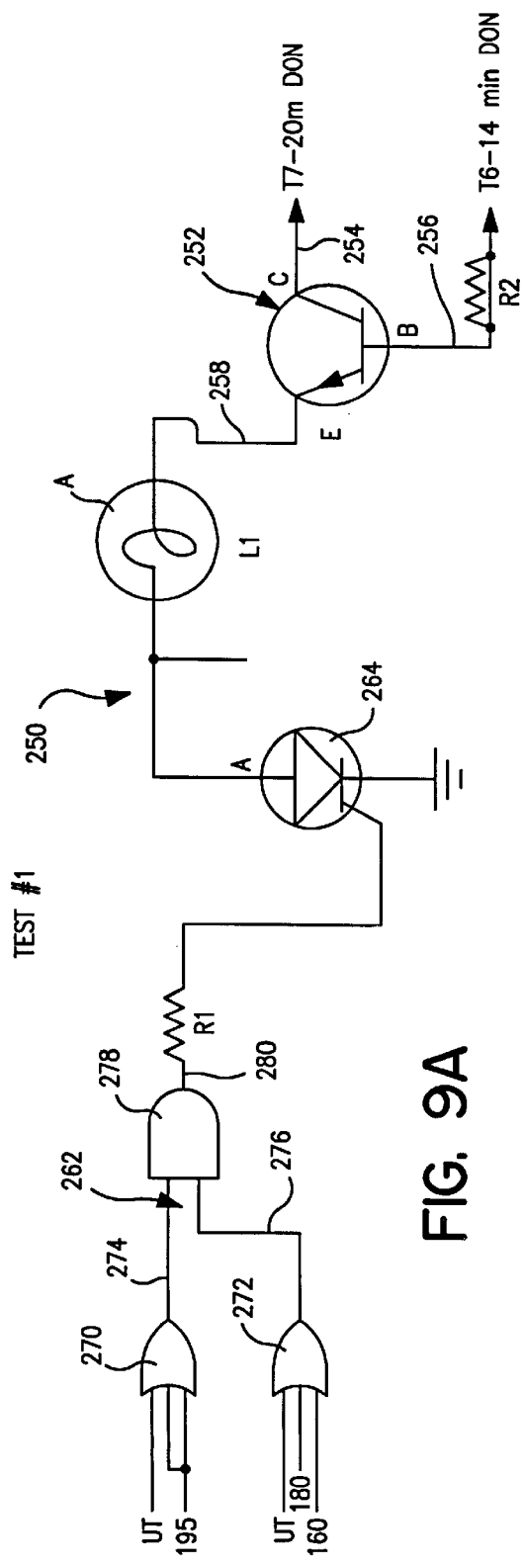
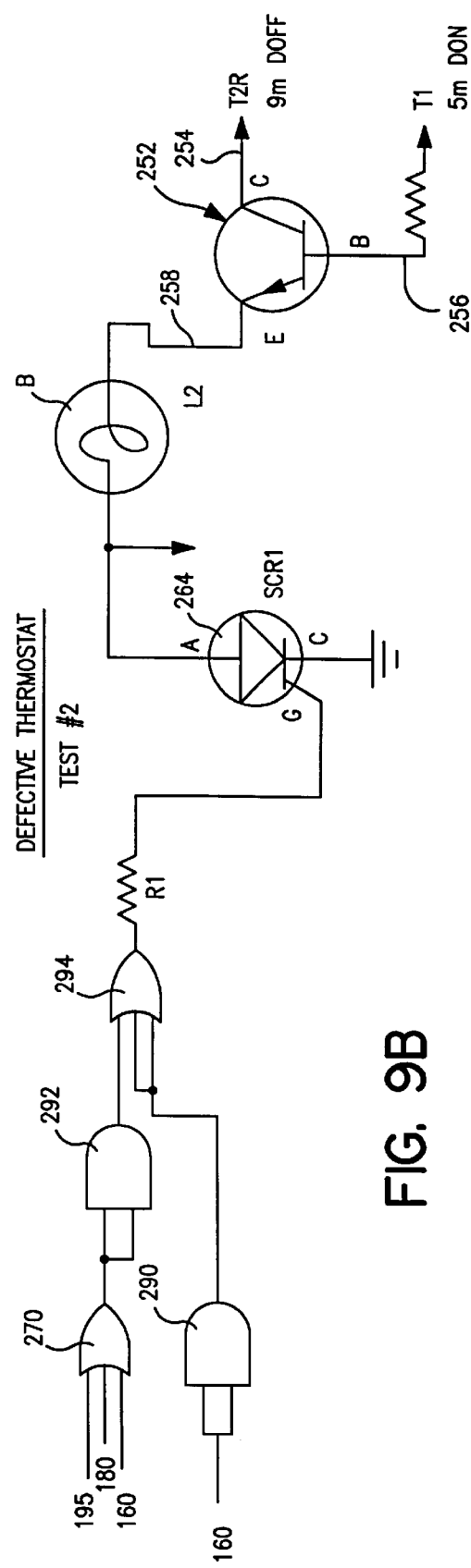
FIG. 9A
FIG. 9B

Test #13
DEFECTIVE HEATERCORE / EXCHANGER

Test #14
Faulty Heater Control Valve

METHODS OF AND APPARATUS FOR IDENTIFYING FAULTS IN INTERNAL COMBUSTION ENGINE COOLING SYSTEMS

FIELD OF THE INVENTION

This invention relates to methods of and apparatus for identifying faults in internal combustion engine cooling systems, and more particularly to such methods and apparatus which monitor cooling system heat capacity.

BACKGROUND OF THE INVENTION

Temperatures inside an internal combustion engine's combustion chambers can reach 4,500° F. Only one half of an engine's coolant capacity is held by an automobile's radiator, nevertheless, the radiator must have the capacity to transfer 150,000 BTUs per hour to the atmosphere. This requires hundreds of gallons of coolant per hour to be circulated through an engine's cooling system. In addition to cooling engines, cooling systems contend with added accessories such as, for example, automatic transmissions which have fluids that must be kept at safe temperatures and cabin heating systems. This is accomplished in a system which utilizes a radiator cap that can extend the coolant's boiling point by less then 13° F.

In the typical vehicle, the cooling system includes a water pump connected in the loop of the cooling system to drive coolant liquid through the engine. A thermostatic valve is mounted approximate the engine block to control the flow of liquid. The thermostat opens when the vehicle engine reached a selected temperature so that the liquid may circulate through the closed loop system and cool the engine. However, since a cold engine does not function properly, a normally operating thermostat remains closed and prevents circulation of cooling liquid until the engine heats to a desirable temperature range and then will subsequently open to allow circulation of cooling liquid.

Coolant liquid passes out of the engine, through the thermostat to a hose which connects the thermostat to the radiator. The radiator is metal and has a plurality of fins which absorb heat from heated coolant liquid. The fins dissipate the absorbed heat through air convection. By passing through the radiator, hot liquid from the engine is cooled and passes through an output hose back to the engine to again be heated while cooling the hot engine. As the engine runs and the vehicle moves, the cooling fluid is continuously circulated and re-circulated through the closed loop cooling system to keep the engine running at the proper temperature. A fan is disposed proximate the radiator to supply a convective stream of air therethrough when the vehicle is not moving.

In most vehicles, a heater core is located proximate the dashboard of the vehicle for receiving heated liquid from the engine in order to heat the vehicle cabin when necessary.

Checking a cooling system for proper operation is a time consuming, inaccurate and frequently inefficient process. Generally, after the engine is started and sufficiently warm, the radiator and thermostat are checked individually while the temperature of the vehicle is monitored to make sure that the engine does not overheat. In order to avoid possible damage to the engine from overheating, the mechanic doing the testing generally has had to pay close attention to the vehicle and engine while the cooling system was monitored for events such as opening of the thermostat. This is accomplished by an experienced mechanic feeling the radiator hoses as the vehicle warms up in order to monitor the system for changes in temperature and pressure. In marginal cases, accurate determinations using hand monitoring has not proved reliable. Consequently, mechanics tend to perform unnecessary repairs and replace parts such as thermostats and water pumps, as well as coolant, in hopes of guessing the cause of the problem.

In view of the aforementioned considerations, there is a need for a simpler and quicker method for testing a cooling system in order to determine the specific cause or causes of a malfunction.

SUMMARY OF THE INVENTION

A feature of the present invention is a new and improved method and apparatus for analyzing cooling systems of automotive vehicles in order to determine which components, if any, of the cooling system are malfunctioning.

With this feature and other features in mind, the present invention is directed to an apparatus for analyzing the cooling system of an internal combustion engine, wherein the engine includes a radiator, a thermostat coupled to the engine, a first hose connecting an inlet at the top of the radiator to the engine and a second hose connecting at the bottom of the radiator to the engine. A first sensor cable is connected to the first radiator hose and a second sensor cable is connected to the second radiator hose. The first and second sensor cables connect the sensors to first and second temperature measuring circuits which have outputs indicative of selected temperature levels. Temperature measuring circuits are connected to collators that serve as switches to apply the outputs of the first and second temperature measuring circuits to inputs of an array of logic circuits. The array of logic circuits have timing circuits connected thereto for providing time/temperature outputs to an array of indicators, wherein each indicator is associated with selected malfunction.

The present invention is also directed to a method of utilizing the aforedescribed apparatus.

DETAILED DESCRIPTION

Figure 1:
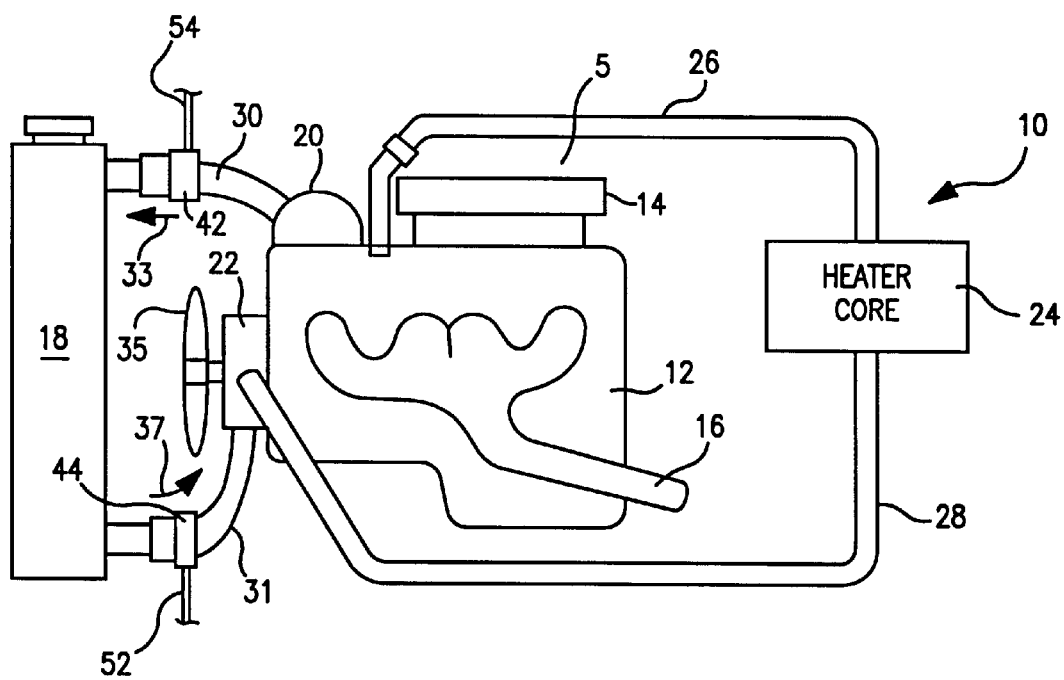
FIG. 1 is a side view of an internal combustion engine with elements of the cooling system thereof generally shown and with temperature sensing clamps attached thereto in accordance with the principles of the present invention.

FIG. 1 illustrates a typical internal combustion engine 5 for a vehicle which utilizes a closed loop cooling system 10 to cool the engine. The typical internal combustion engine 5 has an engine block 12 which burns fuel and provides power to drive the vehicle. The engine 5 also includes a carburetor 14 for introducing fuel to the block 12 and an exhaust system 16 for removing the spent fuel exhaust from the block. Internal combustion and the operation of various moving metal parts (not shown) inside the engine block 12 create heat which must be removed in order for the engine 5 to function properly. In order to cool the engine block 12, the closed loop cooling system 10 includes a heat exchange unit in the form of a radiator 18, a thermostat 20, a water pump 22, and a smaller heat exchange unit 24 for providing heat to the vehicle in the form of a heater core. The water pump 22 circulates and re-circulates cooling liquid through the engine block 12 and the closed loop system 10 as the liquid absorbs heat from the block and its internal parts. The cooling liquid may be water, antifreeze or a combination of water and antifreeze. Hoses 26, 28, 30 and 31 carry the cooling liquid between individual components of the cooling system 10 with heated cooling liquid from the block 12 being cooled by radiator 18 and the heating core 24 and re-circulated back to the engine block 12.

Specifically, the water pump 22 pumps cooling liquid through various internal passages of the engine block 12 where the cooling liquid is heated as it removes heat from the block. The heated cooling liquid from the block 12 flows through hose 26 to the heater core 24, the hose 26 being connected to the block proximate the thermostat 20. The heater core 24 extracts heat from the cooling liquid for heating the passenger compartment and therefore lowers the temperature of the cooling liquid slightly. The hose 28 directs the cooling liquid from the heater core back to the block 12 proximate the water pump 22 where it is re-circulated through the block 12 for cooling purposes. The radiator 18 is connected by an input hose 30 at the top of the radiator to the thermostat 20. Thermostat 20 is a temperature sensitive valve which opens when the cooling liquid is hot and remains closed when the cooling liquid is cool. By remaining closed when the engine is cold, the thermostat 20 generally blocks the flow of liquid from the engine block 12 through the radiator 18 and allows the cooling liquid in the block to heat rapidly. This ensures that the engine block 12 is at an optimum temperature for efficient combustion of fuel dispensed from the carburetor 14 or from a fuel injection system (not shown).

When the cooling liquid in the block 12 reaches a selected temperature indicating that the engine block itself is at its desired temperature, the thermostat 20 opens and the water pump 22 pumps cooling liquid out of the engine block through the top input hose 30 in the direction of arrow 33. The thermostat 20 does not directly adjust the temperature of this cooling system 10, rather the thermostat lets cooling liquid out of the engine block when the liquid in the thermostat is above a selected temperature and stops liquid from leaving the engine block 12 when the temperature is below the selected temperature. Accordingly, when thermostat 20 is not working properly, the engine 5 will either overheat or be under heated. If the thermostat 20 is stuck closed, it will never allow cooling of the engine block 12 by the radiator 18 and, the thermostat, if stuck open, will not allow the engine block to heat to its proper operating temperature.

While the thermostat 20 is open, heated liquid coolant in the hose 30 is directed into the top of the radiator 18 and through a series of small tubes (not shown) within the radiator. The heat from the liquid is conducted through the metal tubes to convection fins (not shown). Air circulating around the fins, either through the motion of the vehicle or rotation of fan 35, or both, moves heat from the fins so that the radiator 18 removes heat from the cooling liquid and dissipates the heat into the air. The water pump 22 also pumps the cooled liquid from the bottom of the radiator 18 to bottom outlet hose 31 back into the engine block 12 in the direction of an arrow 37. The cooling liquid is again reheated due to heat in the block 12. By continuously circulating, the cooling fluid maintains the engine block 12 at its proper operating temperature.

Figure 2:
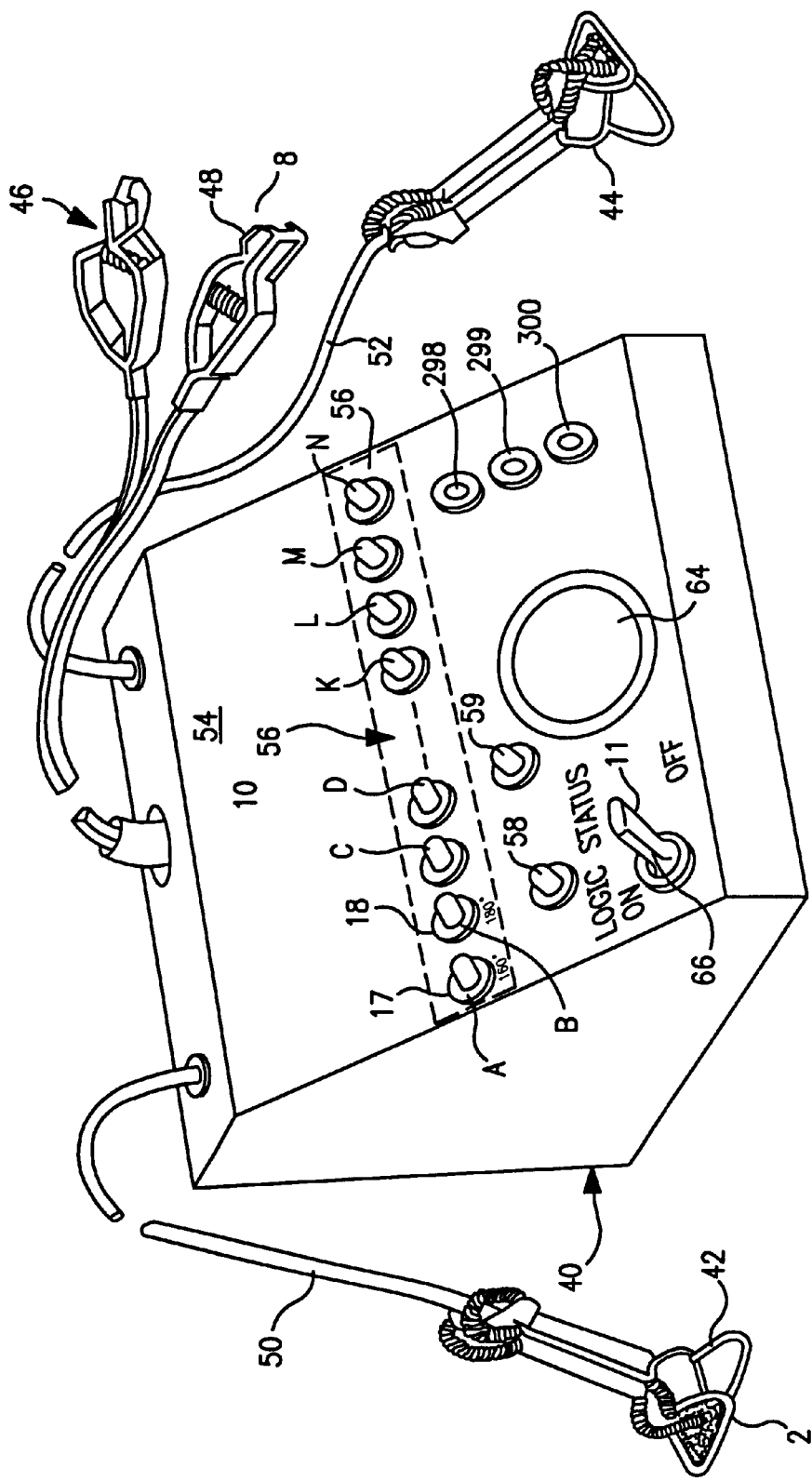
FIG. 2 is a view of an analyzer console and housing arranged in accordance with the principles of the present invention.

Referring now to FIG. 2 in combination with FIG. 1, an analyzer unit 40 is connected to the cooling system 10 of the engine 5 by a first clamp 42 which clamps to the top hose 30 and a second clamp 44 which clamps to the bottom hose 31. Clamps 42 and 44 are the only connections to the as cooling system 10 of the internal combustion engine 5. The analyzer unit 40 is connected to a 12 volt power supply, most conveniently provided by the battery 110 of the engine 5 by a positive lead 46 and a negative lead 48. The first clamp 42 is connected by the first sensor cable 50 the analyzer unit 40, while the second clamp 44 is connected by a sensor cable 52 to the analyzer unit.

The analyzer has a face plate 54 with any array 56 of fourteen read-out lights A-N, a status light 58 and a defect buzzer 64. The only switches necessary on the face plate 54 are an on/off switch 66.

Figure 3:
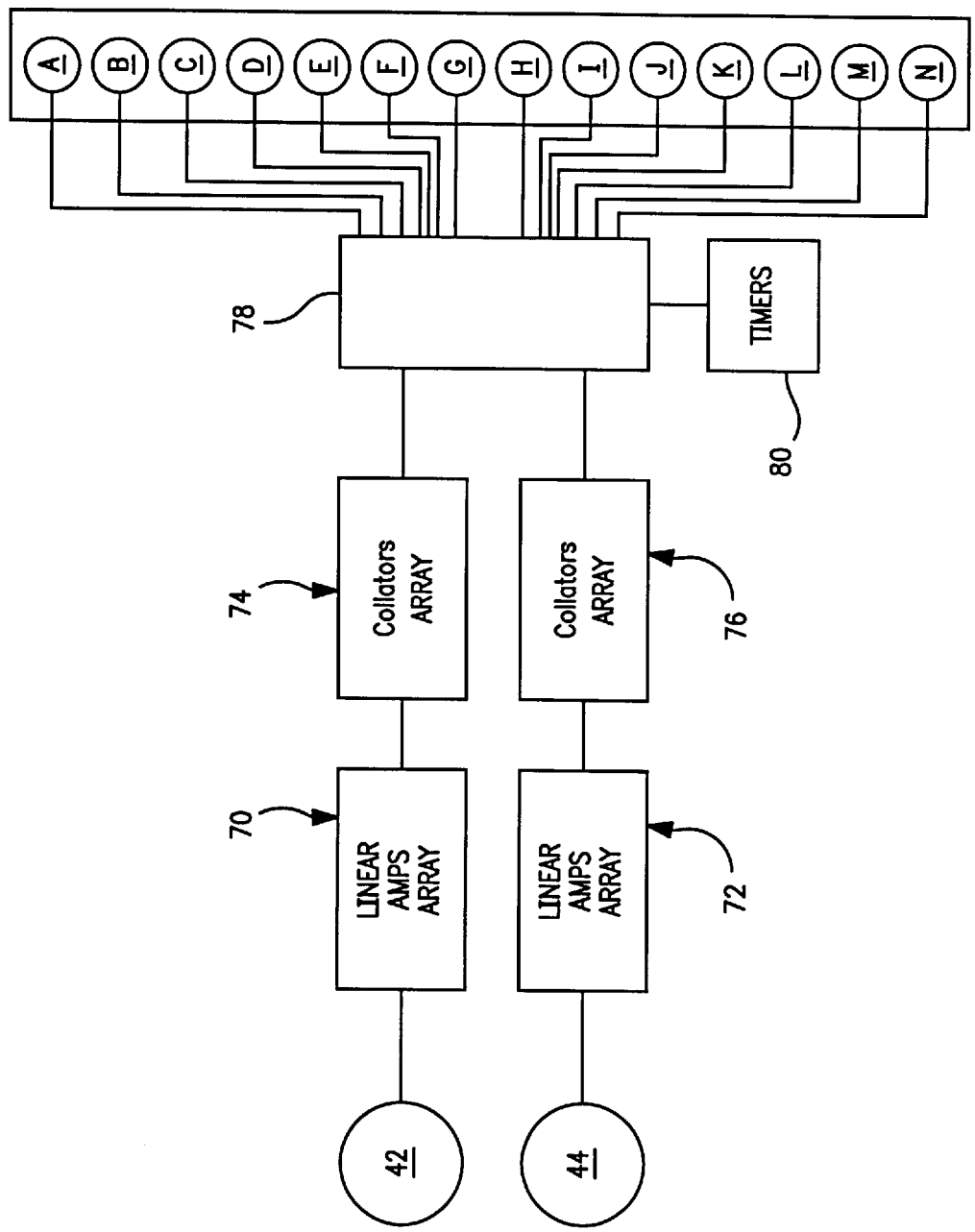
FIG. 3 is a block diagram of circuitry within the housing of FIG. 2.

Referring now to FIG. 3 in combination with FIG. 2, it is seen that the first hose clamp 42 is connected by the first sensor cable 50 to a first array of linear amplifiers 70 while the hose clamp 44 is connected the by the second sensor cable 52 to a second array of linear amplifiers 72. The arrays 70 and 72 of linear amplifiers have outputs when selected temperatures are reached. These outputs are applied to first and second arrays of collator circuits 74 and 76, respectively, which act as switches to turn the lamps A–N in the lamp array 56 "On", if necessary, or "Off", if necessary.

In order to coordinate illumination of the lamps A–N in the array of lamps 56, a logic circuit bank 78 is provided which is connected to the banks of collator circuits 74 and 76 and to timer circuits 80. The inputs of temperature levels from the collators 74 and 76 combine with the inputs from the timers 80 to control the logic circuits 78 so that the outputs from the logic circuits illuminate the lamps A–N in accordance with a time/temperature protocol. As will be explained hereinafter, the time that it takes the temperature to rise in the typical internal combustion engine 5 to selected temperature levels is indicative of performance and the functioning of specific components of the cooling system 10. If the cooling system does not rise to a particular level in a pre-selected time interval, or rises too rapidly to that level, then the malfunction of a specific component of the cooling system can, according to the present invention, be identified.

Figure 4:
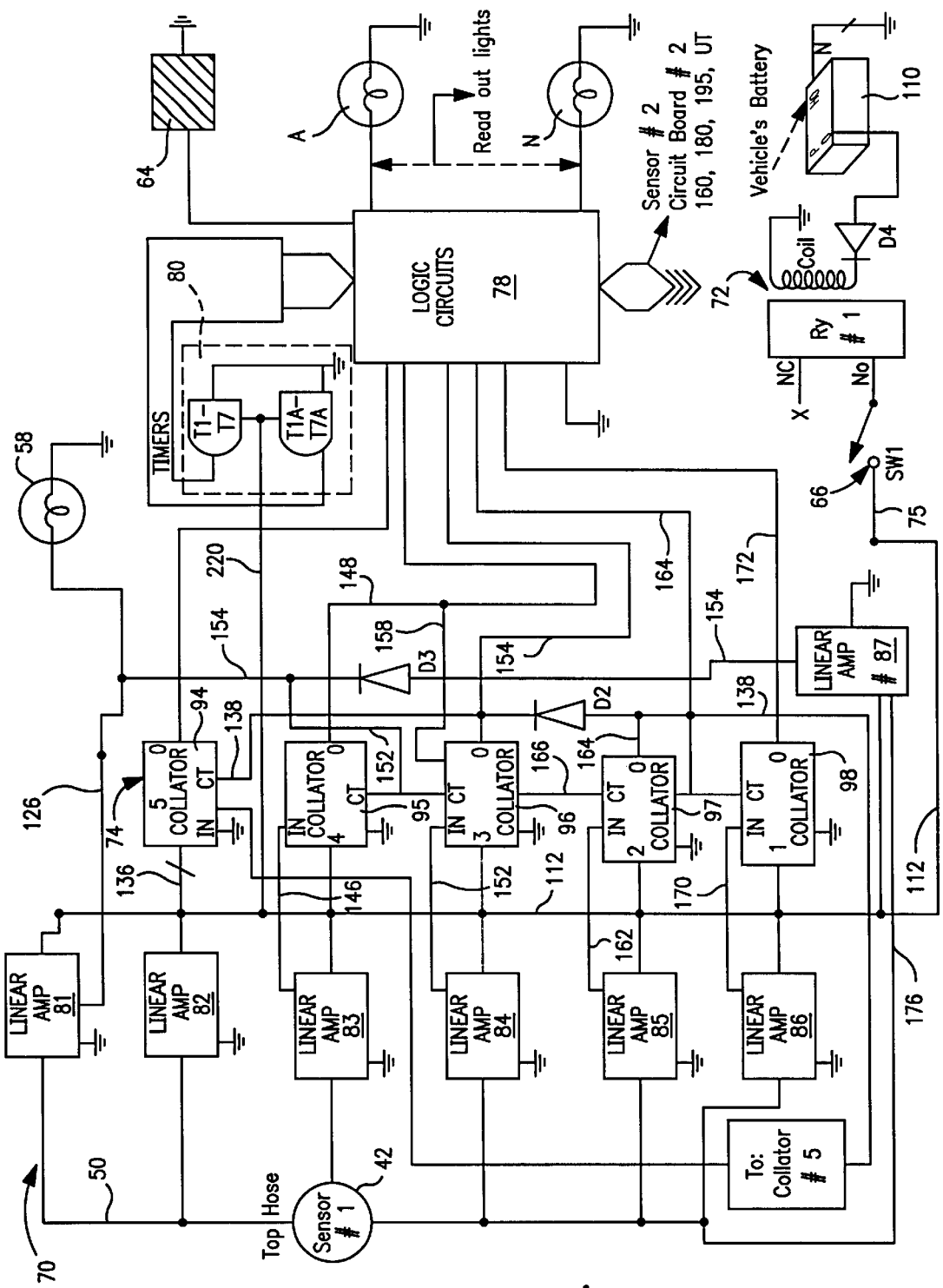
FIG. 4 is a block diagram showing circuitry associated with a first sensor attached to a top radiator hose of the cooling system of FIG. 1.
Figure 5:
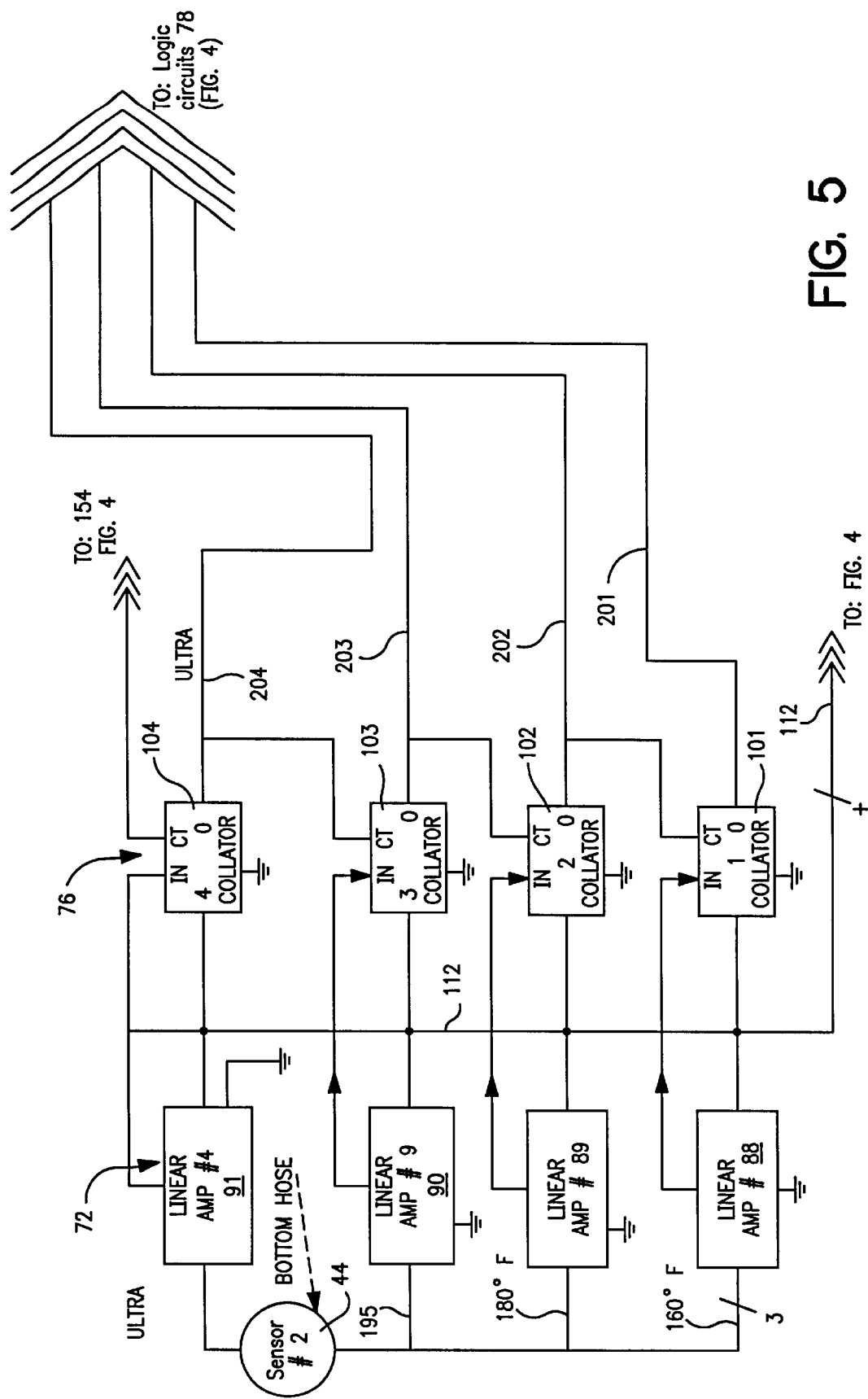
FIG. 5 is a block diagram of circuitry connected to a second sensor which is attached to a lower radiator hose of the cooling system of FIG. 1.
Figure 6A:
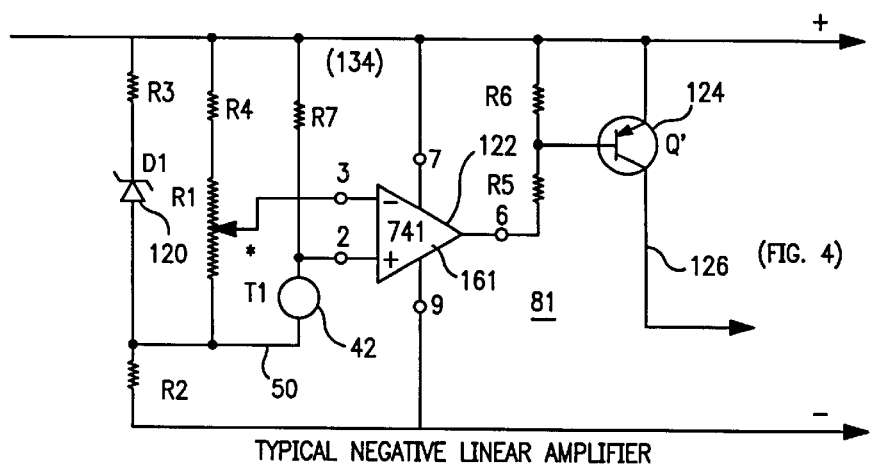
FIG. 6A is a circuit diagram of a negative linear amplifier used in the block diagram circuitry of FIG. 4.
Figure 6B:
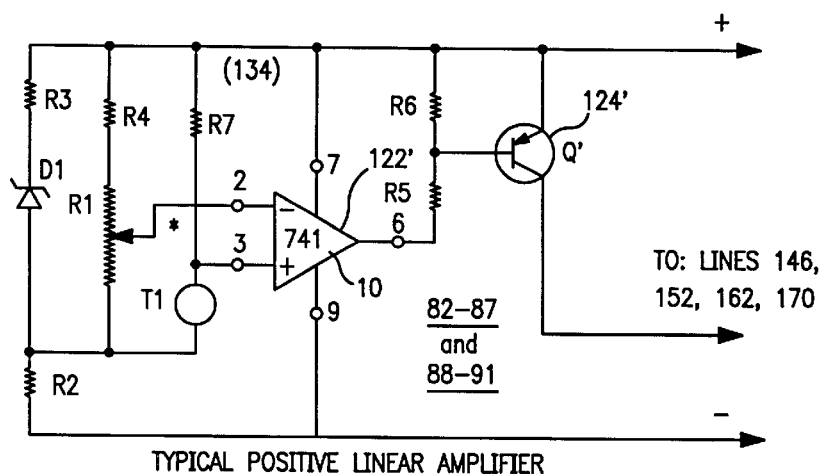
FIG. 6B is a circuit diagram of one of a number of positive linear amplifier circuits used in the block diagram circuitry of FIGS. 4 and 5.
Figure 7:
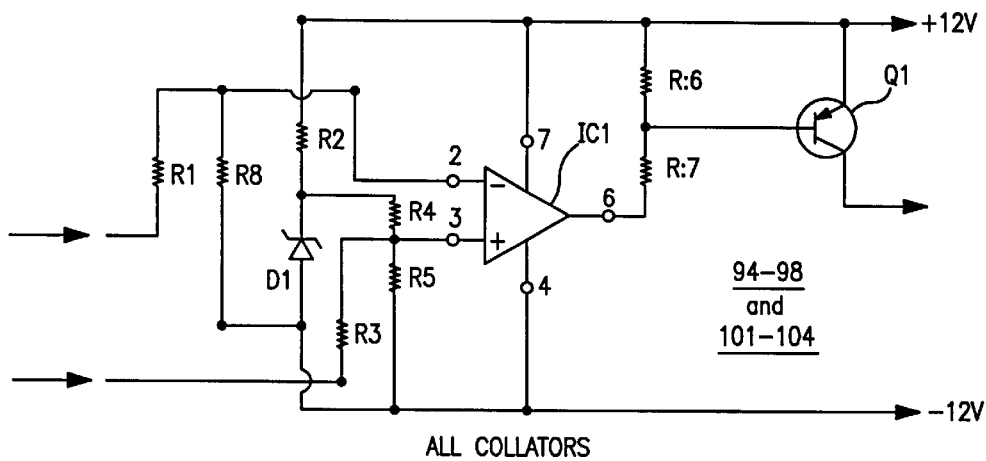
FIG. 7 is a circuit diagram of one of a number of collator circuits used in collators shown in FIGS. 4 and 5.

Referring now to FIGS. 4 and 5 in combination with the linear amplifier circuitry of FIG. 6 and the collator circuitry of FIG. 7, the sensor 42 on the top radiator hose 30 is connected by a line 62 to the first array 70 of linear amplifiers 81–86 with each linear amplifier having an output when a selected temperature level is reached in the hose 30. The test is started with the engine 5 cold by closing the on/off switch 66 connecting the circuits of FIGS. 4 and 5 to the car battery 70 through a relay 72. Line 75 applies current to each of the linear amplifiers in the linear amplifier arrays 70 and 72 and to the collators and the collator circuits 70 as well as the status lamp 58. Current on the line 75 is applied by line 112 to the six linear amplifiers 81–86 of the circuit of FIG. 4, as well as the linear amplifies 88–91 of the circuit of FIG. 5. Additionally, the current on line 75 is applied to the collators 92–96 of FIG. 4 and 97–100 of the circuit of FIG. 5. A single timer circuit T0 is connected between the linear amplifier 81 and the first defect light "A" via a relay 106 and a diode 107 over line 108. The line 108 is also connected to the buzzer 64 (see FIG. 2). A second array of timers T2–T13 comprise the timers for the other logic functions displayed by lamps B–N and are identified in FIG. 3 with the timing circuit 80.

With the exception of linear amplifier 81, which is the negative linear amplifier illustrated in FIG. 6A, the linear amplifiers 82–86 in the linear amplifier array 70 are positive linear amplifiers and the linear amplifiers 88–91 in the linear amplifier array 72 are positive linear amplifiers. Exemplary of positive linear amplifiers is the linear amplifier circuit of FIG. 6B.

The negative linear amplifier circuit of FIG. 6A, used in linear amplifier 81, does not sense temperature, but, as will be explained further hereinafter, illuminates the status lamp 58 and enables illumination of a defect lamp 59, as well as the sounding of the buzzer 64. Linear amplifier 81 also indicates that the clamp 42 is applying current to the sensor cable 50.

The positive linear amplifier circuits 82–86 of FIG. 4 sense the following temperature level outranges of the top hose 30 sensed by sensor 42:
  linear amplifier circuit 82—160° F.
  linear amplifier circuit 83—180° F.
  linear amplifier circuit 84—195° F.
  linear amplifier circuit 85—210°–218° F. (ultra)
  linear amplifier circuit 86—232° F. (hot, boiling)
The positive linear amplifiers 88–91 of FIG. 5 connected to the sensor 44 on bottom hose 31 have the following outrange temperatures:
  linear amplifier circuit 88—160° F.
  linear amplifier circuit 89—180° F.
  linear amplifier circuit 90—195° F.
  linear amplifier circuit 91—210°–218° F. (ultra).

The linear amplifier circuits 82–86 are each connected to one or more of the collators 94–98 which serve as switches that provide inputs to the logic circuits 78 (see FIG. 3) and which cut off outputs from the linear amplifier circuits 82–86 so that the logic circuitry 78 can illuminate the lamps A–M in accordance with a protocol which is readily understandable by a person using the analyzer 40. Likewise, linear amplifier circuits 88–91 are each connected through collators 101–104 which interact with the logic of logic circuitry 78 to introduce temperature level signals and to cut off temperature level signals so that the lamps A–N function in accordance with a logical protocol.

Operation

Referring now mainly to the first circuit board of FIG. 4, when the switch 66 is closed on the panel 55 of the analyzer unit 40 shown in FIG. 2, current flows from the vehicles battery 110 to a power line 112 so as to energize various elements of the circuitry shown in FIGS. 4 and 5. The test starts with the engine 5 cold so that the only linear amplifier circuit initially responding is linear amplifier circuit 81. This is because linear amplifier circuits 82–86 respond only when there is hot coolant flowing from the engine 5 through the upper hose 30 that can be sensed by the sensor 42, while the linear amplifiers 88–91 only respond when there is hot coolant flowing through bottom radiator hose 31 that is sensed by sensor 44. The linear amplifier 81 has output to the status lamp A because, as is seen in FIG. 6A, the amplifier circuit is arranged with a silicon diode 120 that is connected to the 3-pin of 741IC linear amplifier chip 122 that has an output connected to a power transistor 124, which is connected over a line 126 to status lamp 58. The negative linear amplifier circuit 81, as exemplified in FIG. 6A, includes an array of resistors R2–R7 which are sufficient to load the amplifier for detection of very weak voltage in the line 50 connected to the sensor 42, but are not sufficient to monitor specific temperature levels. The status lamp 58, which is illuminated by the output on the line 126, simply indicates that the coolant is not up to its operating level. In other words, the coolant is less than 160° F. When the status lamp 58 is lit, it also indicates that there is current flowing through the line 50 sufficient to continue with the test. If there is no current flowing through the line 50, the status lamp 58 is not lit indicating that something is wrong with the sensing aspect of the analyzer 40.

Current on the line 112 also initiates operation of a first timer $T_1$ which times out at approximately eight minutes, eight minutes being the time at which the temperature of the coolant in the top hose 30 (see FIG. 1) should have reached 160° F. (as detected by the linear amplifier circuit 82). In addition to illuminating the status lamp 58, current on the line 126 energizes the coil 128 of relay 129 so that when an output from the time T0 is applied to the relay 129, the normally open connection applies current to a line 132 which is connected through a diode D1 to the defect light 60 and buzzer 64, which are on the panel 55 of the analyzer 40. Whether or not the defect light 59 is illuminated and the buzzer 64 sounds depends on whether or not there is a defective thermostat 22 or a removed thermostat. If the thermostat 20 (FIG. 1) is defective or removed, the temperature of the coolant will not reach 160° F. within eight minutes, but take substantially longer. In order to determine if the temperature is at 160° F., the output of a linear amplifier 82 is addressed.

Linear amplifier 82 is a positive linear amplifier version of the linear amplifier shown in FIG. 6B. It includes an array of similar resistors 134' which result in the 741IC linear amplifier 122' having an output when the input on the positive pin 3 of the linear amplifier exceeds the input on negative pin 2 of the linear amplifier. The resistors in the resistor array 134' are calibrated so that at 160° F. there is an output applied over line 136 to the collator 94 because the transistor Q1 in the positive linear amplifier circuit 82 of FIG. 6A has been turned on.

The status lamp 58 remains on until the outrange level of 180° F. is reached. The cut off pin in comparator 94 is connected by a line 138 to the input pin, which line 138 also provides a 160° F. signal to the logic circuits.

Linear amplifier circuit 83, like linear amplifier circuit 82, is a positive linear amplifier which includes an array of resistors 134 comprised of resistors $R_1$–$R_7$, $R_1$ may be replaced by a bank of selected resistors to provide a different temperature level output for each linear amplifier. The resistor array 134 provides an output from transistor 124 over a line 146 when an outrange temperature level of 180° F. is reached. The output of the linear amplifier 83 is applied to the collator 95 which has an output over line 148 which is applied to the logic circuitry 78, indicating that a 195° F.

temperature has been reached by the coolant in the top radiator hose 30 of the cooling system 10 (see FIG. 1). The collator 95 also has a cut off signal applied over line 150 to a line 152 that is connected to line 154 which cuts off status lamp 58 so that the mechanic testing the system knows that the coolant has reached operating temperature. The linear amplifier 83 serves the purpose of shutting off the status lamp 58 when the temperature of the coolant in the cooling system 10 is below desirable operating temperature, i.e., 180° F. or above desirable temperature, i.e., above the ultra range of 200°–218° F.

Linear amplifier circuit 84 is a positive linear amplifier circuit in which the array of resistors 134 are calibrated so that the transistor 124 has an output when the temperature on the line 150 rises to an outrange temperature of 195° F. When the coolant reaches 195° F., the linear amplifier 84 has an output on a line 152 which is applied to the input of the collator 96. The collator 96 has an output on line 154 that is applied to the logic circuits 78 as the 195° F. signal. There is also a cut off output from line 158 that cuts off the 180° F. signal on line 148.

Linear amplifier circuit 85 is a positive linear amplifier circuit of FIG. 6B, wherein the resistor array 134 is calibrated so that the transistor 124 has an output over line 160 when the temperature level reaches 210°–218° F., which is the ultra high temperature that results in the clutch of the engine fan 35 (see FIG. 1) engaging so that there is additional air passing through the radiator 18. The output from the linear amplifier circuit 85 is applied over line 162 to the collator 97 which results in an output on line 164 that is applied to logic circuits 78 as the ultra signal indicating a coolant temperature in the range of 210–218° F. As with the collators 94, 95 and 96, the collator 97 has a cut off on line 166 that cuts off the 195° F. signal from collator 96 on line 154. The output on line 164 is also applied over line 138 back to collator 94 to provide an input to collator 94 so as to illuminate the defective light and sound the buzzer 64.

Finally, the linear amplifier circuit 86 causes positive linear amplifier circuitry of FIG. 6B to have an output on line 170 if the array of resistors 134 indicate a temperature level of 232° F., which is indicative of the coolant boiling. The output on line 170 is applied to a collator 98 which has an output on line 172 that is applied to the logic circuit 78 indicating an overheating engine. A cut off output on line 174 shuts off the ultra signal indicating temperatures in the range of 210°–218° F. on line 164. As with the output through collator 97, the output from collator 98 on line 172 is applied to line 138 that is connected to the collator 94 which results in the defect light 59 illuminating and the buzzer 64 sounding because there is an output on line 132 from the collator 94. The linear amplifier 86 is connected by a line 176 to the sensor cable line 50 and includes positive linear amplifier circuit of FIG. 6B, which is similar to that in linear amplifier circuit 86 with an array of resistors 134 that cause an output on line 154 when the temperature level reaches 232° F. so as to apply current to the line 126 and turn on the status lamp 58 indicating to the mechanic using the analyzer 40 that the coolant is too hot because it exceeds 232° F.

Referring now more specifically to FIG. 5 where the sensor 44 is connected to the bottom hose 31, the sensor cable 52 has its output connected to the linear amplifier array 72 comprising the linear amplifier circuits 88–91, which are all positive linear amplifier circuits such as the circuit of FIG. 6B in which the array of transistors 134 are calibrated to sense temperature levels of 160° F., 180° F., 190° F. and 210°–218° F. (ultra). As with the arrangement of FIG. 4, the circuitry of FIG. 5 is energized by line 112 and, as with the circuitry of FIG. 4, the collators 101–104 provide outputs on lines 201–204, which are applied to the logic circuits 78 providing inputs for 160° F., 180° F., 190° F. and 210°–218° F.(ultra), respectively.

Figure 8:
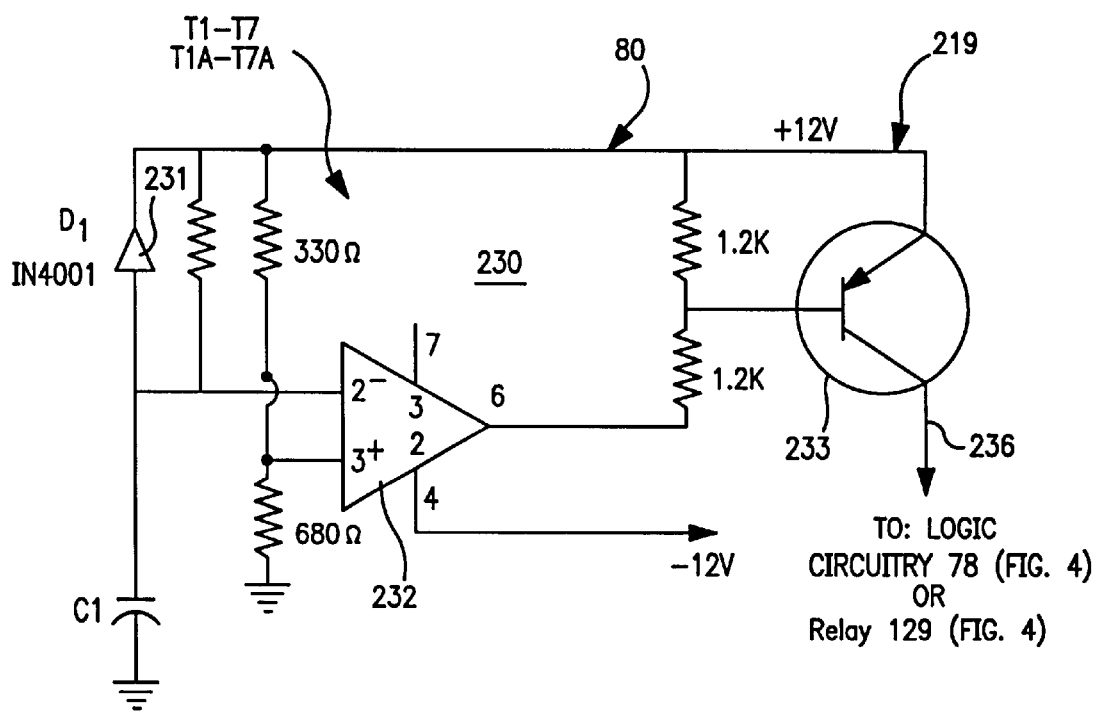
FIG. 8 is a circuit diagram for one of a number of delayed-"on" and delayed-"off" timers used with the circuitry of FIGS. 4 and 5.

The temperature level sensing arrangement and the outputs thereof have been described thus far as providing temperature level inputs to the logic circuitry 78. In addition to the temperature level inputs, there are timing inputs provided by timing circuits 80 which include the Delayed-On timers T1–T7 and delayed-off timers T1A–T7A, each of which is started by an input over line 220 (see FIG. 4) connected to the line 112 which is energized upon closing the switch 66. The timers each have the circuitry of FIG. 8, wherein a capacitor C1, a resistor array 230 and a diode 231 are connected in a known fashion through a linear amplifier 232 and through the base of a power transistor 233 to provide output from the emitter 236 of the transistor to the logic circuitry 78. Each of the timers T1–T7 and T1A–T7A has the same configuration with the exception of the capacitors being calibrated to provide outputs at different preselected time intervals.

| Capacitor Parameters and Delayed-On and Delayed-Off Times | |
| --- | --- |
| Delayed-On | Delayed-Off |
| T1-5 minutes-100 µf, 35v | TIA-5 minutes, 100 µf, 50v; 10 µf, 50v; 10 µf, 35v |
| T2-8 minutes-150 µf, 25v | T2A-9 minutes, 100 µf, 35v; 50v |
| T3-9 minutes-150 µf, 25v; 33 µf, 35v | T3A-10 minutes-120 µf, 35v; 47 µf, 35v |
| T4-10 minutes-470 µf, 35v; 33 µf, 35v | T4A-12 minutes-150 µf, 35v; 22 µf, 50v |
| T5-12 minutes-220 µf, 35v; 10 µf, 35v | T5A-14 minutes-150 µf, 35v; 22 µf, 50v . . . 22 µf, 50v |
| T6-14 minutes-220 µf, 35v; 33 µf, 35v | T6A-15 minutes-150 µf, 35v; 22 µf, 50v . . . 22 µf, 50v |
| T7-20 minutes-330 µf, 16v | T7A-25 minutes-150 µf, 63v; 47 µf, 25v; 47 µf, 25v . . . 22 µf, 35v; 22 µf, 35v |

Figure 9C:
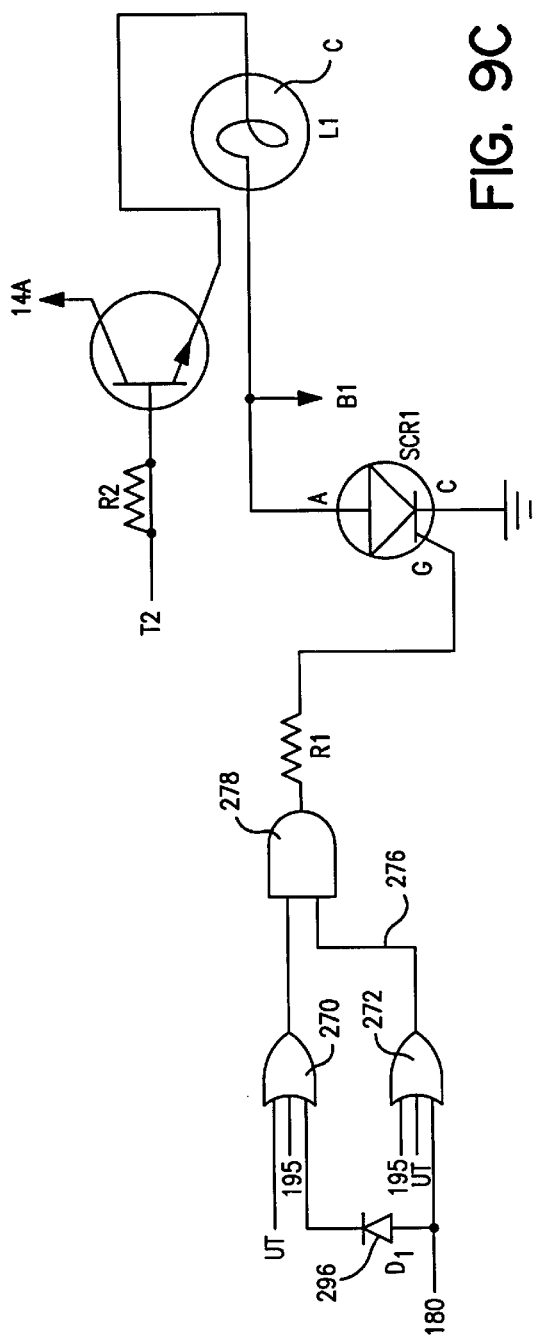
FIGS. 9A–9N are circuit diagrams of logic circuits used to illuminate lamps indicating a fault or malfunction in the cooling system of FIG. 1.
Figure 9D:
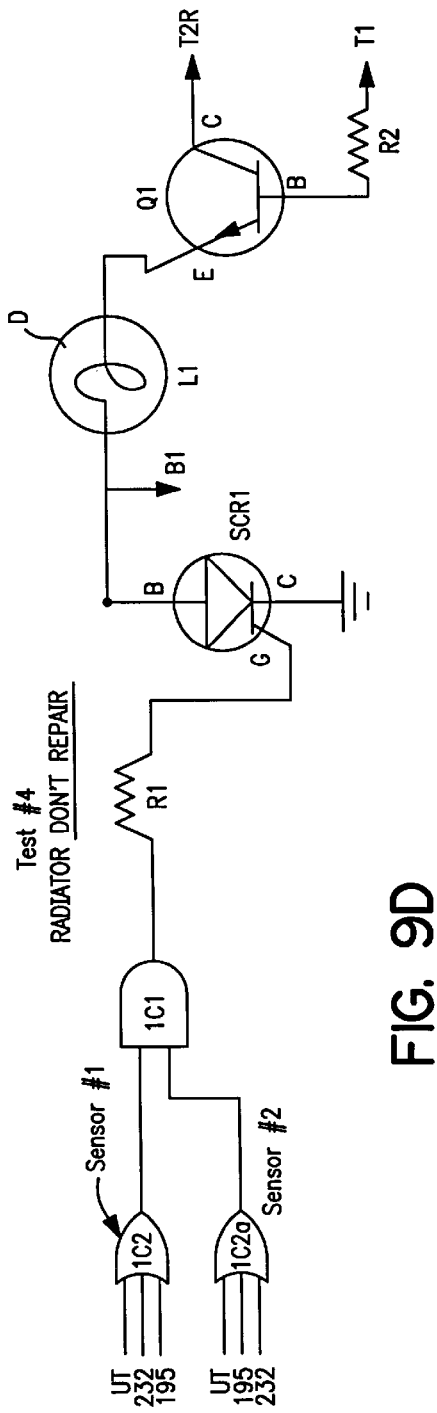
Figures 9E, 9F:
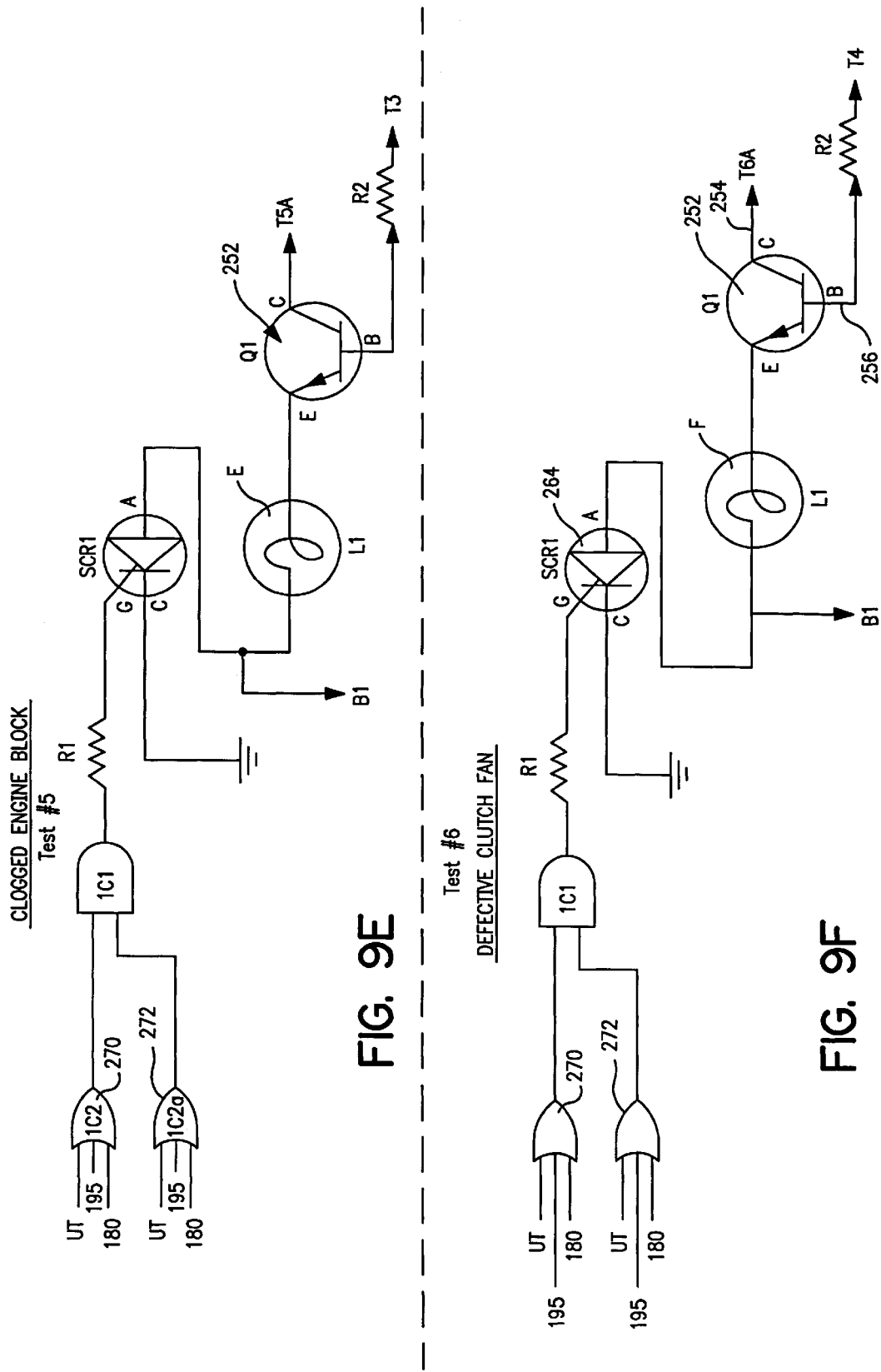
Figure 9G:
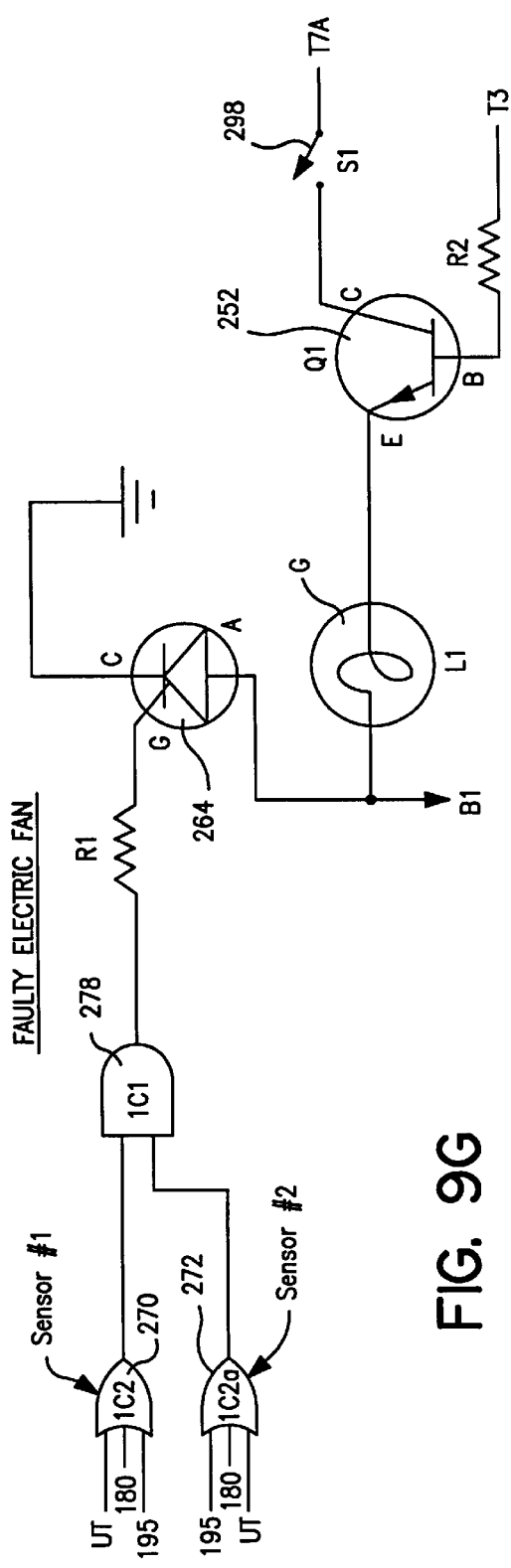
Figure 9H:
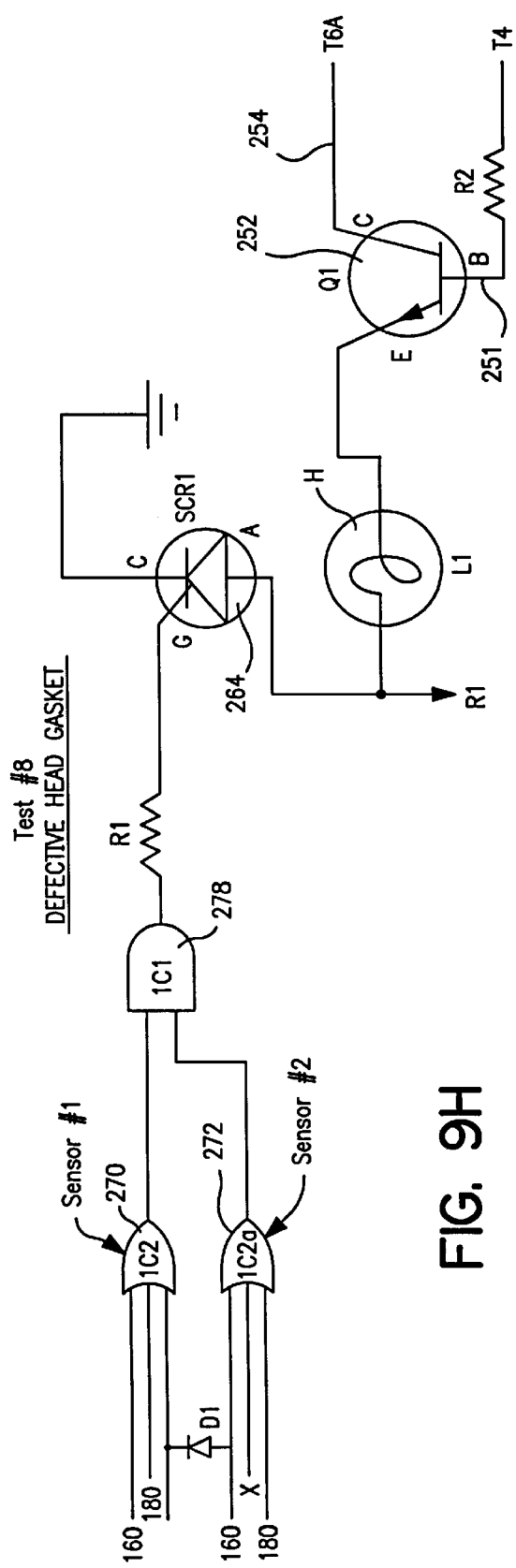
Figure 9I:
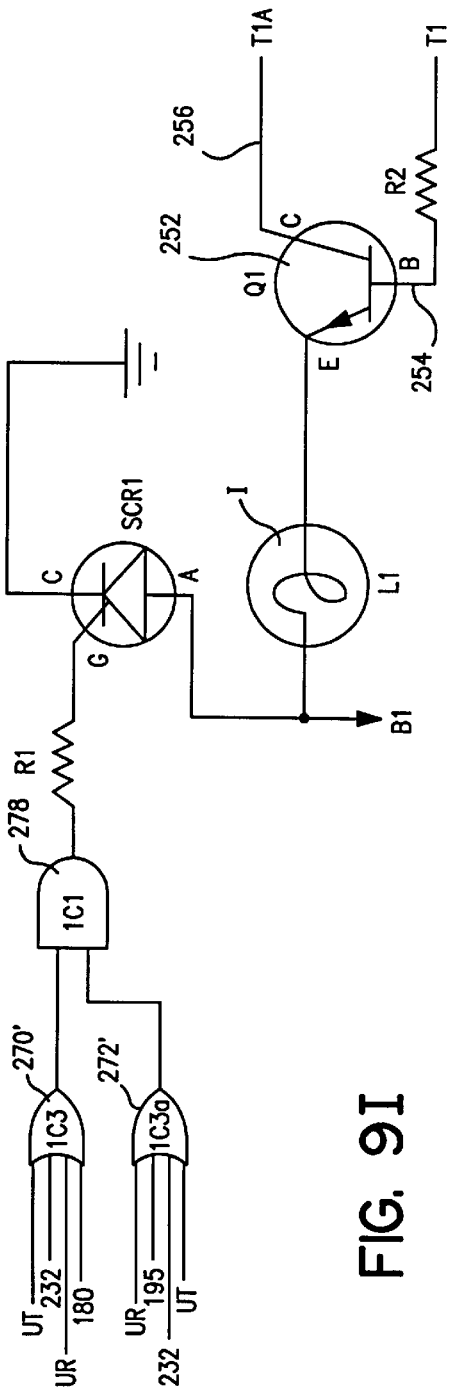
Figure 9J:
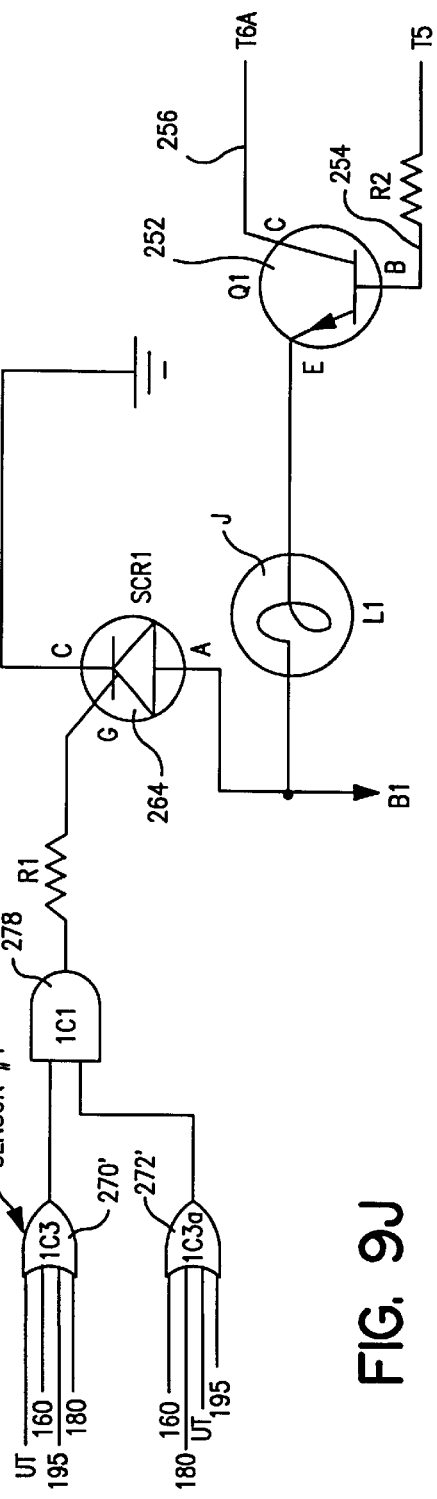
Figure 9K:
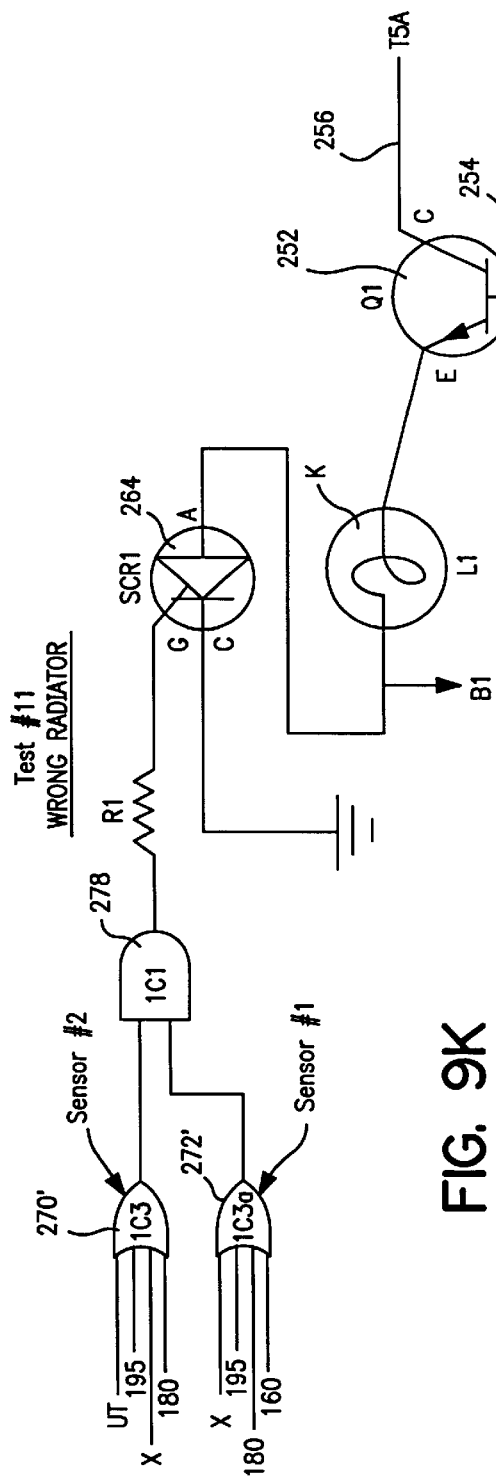
Figure 9L:
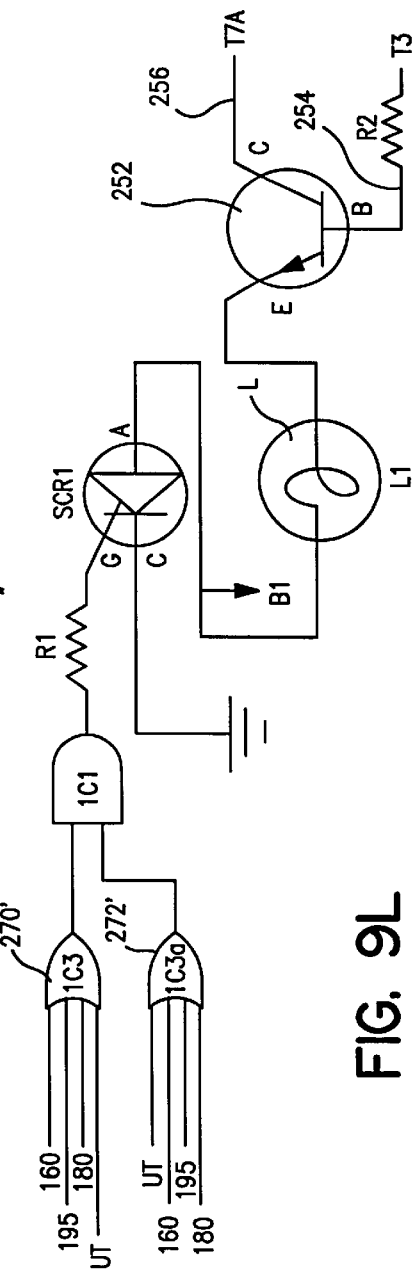
Figure 9M:
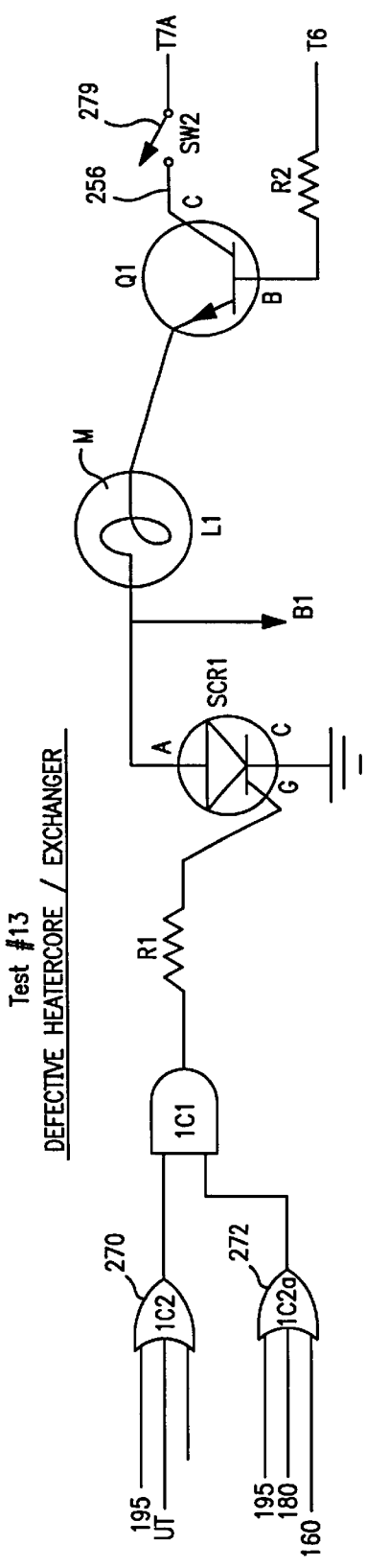
Figure 9N:
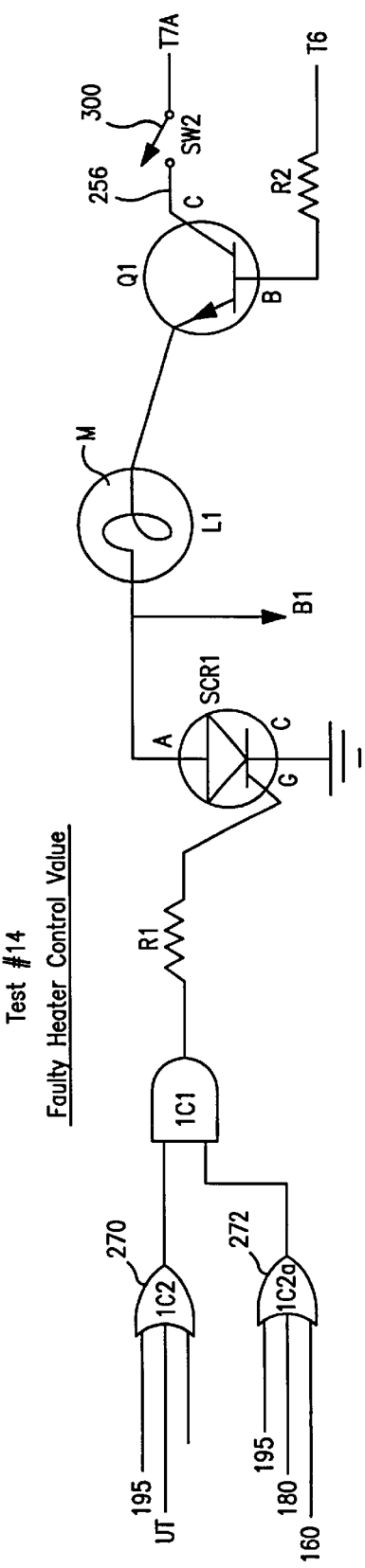

Referring now to FIGS. 9A–9N, there are shown logic circuits for testing the cooling system 10 to determine if there are faults. Generally, inputs from the collators, which provide the 160° F., 180° F., 195° F., and 210°–218° F. ultra (UT) signals from both the sensor 42 the top hose 30 and the sensor 44 attached to the bottom hose 31 (in FIG. 1), are applied to the thirteen separate logic circuits 250 comprising the logic circuitry 78. The logic circuits 250 are each comprised of a power transistor 252 which has a collector lead 254, a base lead 256 and an emitter lead 258. The collector lead 254 is connected to a selected timer, while the base lead 256 is connected to an another selected timer. The emitter lead 258 is connected directly to one of the lamps A–N in the lamp array 56 (FIGS. 2 and 3) and to the buzzer 64. Accordingly, when the transistor 252 is on, one of the lamps A–N is "on" if logic 262 enables silicon control rectifier 264 to conduct current on line 266 from the selected lamp B–N to ground 268. The logic circuit 262 consists of a first three input OR-gate 270 which is associated with the sensor 42 connected to the top hose 30 of the cooling system 10 which cools the internal combustion engine 5. A second three input OR-gate 272 has inputs associated with the bottom sensor 44 which is attached to the bottom hose 31 of the cooling system 10 of the internal combustion engine 5. The OR-gates 270 and 272 have outputs 274 and 276 which are inputs for an AND-gate 278. The output 280 of the AND-gate 278 is applied through resistors R1 to the silicon control rectifier 264, which when "on" at the same time that the transistor 252 is "on", allows current to flow through a selected one of the lamps A–N to ground and thus illuminate the lamp and sound the buzzer 64. Thus, if the temperature levels are within a selected range during a selected time period, then there is a fault in the system which is dependent on time/temperature condition in the cooling system 10 of internal combustion engine 5. The selected time period is determined by the capacitance of the timing circuit FIG. 8. The following descriptions of the circuits 9A–9N are in conjunction with times selected by timing circuits of FIG. 8.

LOGIC CIRCUIT COMPONENTS

Buzzer 64-PE28--AII Electronics

Lamps A–N-272-33L Radio Shack

AND-GATE 278-4081 QUAD 2 INPUT AND-GATE OR-GATES 270' and 272'-CD40R

OR-GATES 270 and 272-4071 QUAD 2 INPUT OR GATE

Resistors $R_1$—560 ohm ½ watt; Resistors R2.2K, ½ watt

SCRS 264-275-1020 Radio Shack

Transistors 252-MJE 3055 T

Referring now to FIG. 9A, there is shown logic circuit 250 for testing a "good cooling system" in which inputs to the OR-gates 270 and 272 from the various temperatures selecting circuits are provided by the linear amplifiers 81–86. The inputs to OR-gate 270 are the ultra temperature range (UT) and 195° F. temperature signals from the top input hose 30 (see FIG. 1) while the temperature supplied to the OR-gate 272 are from the UT range, 180° F. and the 160° F. from the bottom outlet hose 31. In the "good cooling system" test, the base 256 of transistor 252 is connected to timing circuit T6 and turns on after 14 minutes and the collector 254 is connected to timing circuit T7 which turns on after 20 minutes. This combination of temperatures and time intervals illuminates lamp A in the lamp array 56 of FIG. 3.

Referring now to FIG. 9B, a "defective thermostat" test is conducted in which lamp B of FIG. 3 is illuminated. In FIG. 9B, the temperature inputs to the OR-gate 270 are 195° F., 180° F. and 160° F. signals from top hose 30 and the single temperature input to AND-gate 290 is a 160° F. signal from the bottom hose 31. In the arrangement of FIG. 9B, unlike the other logic circuits, there is an AND gate 292 in series with the OR-gate 270 which has an output connected to an OR-gate 294 which also receives an input directly from the AND-gate 290. Timing inputs for the defective thermostat test are T1 on base 256 which turns on at 5 minutes and T2A on collector 254 which turns off at 9 minutes.

Referring now to FIG. 5C, there is shown the logic for a test for a defective radiator 18 (FIG. 1) which can be repaired. In this test, the AND-gate 270 has inputs from the top radiator hose 30 of UT and 195° F., as well as a 180° F. input from the bottom radiator hose 31 through diode 296. The AND-gate 272 receives inputs from the lower radiator hose 31 of 195° F., UT and 180° F. The timing inputs are a delayed-on signal T2 of 8 minutes on the base 254 and a delayed-off signal T4A of 12 minutes on the collector line 254. A defective radiator test in which the radiator can be repaired in FIG. 9C is in contrast with the test of FIG. 9D where the radiator cannot be repaired.

Referring now to FIG. 9D, it is seen that the OR-gate 270 has input temperature signals of UT, 232° F. and 195° F. from the top radiator hose 30, while the OR-gate 272 has input of UT, 95° F. and 232° F. from the bottom radiator hose 31. The timing parameters are a delayed-on signal T1 of 5 minutes on the baseline 256 and a delayed-off signal T2A of 9 minutes. When these conditions occur, the lamp D is illuminated.

Referring now to FIG. 9E, there is shown a test for a clogged engine block in which the lamp E illuminates. In the test of FIG. 9E, the OR-gate 270 has inputs from the upper hose 30 of UT, 195° F. and 180° F. while the OR-gate 272 has inputs from the bottom hose 31 of UT, 195° F. and 180° F. There is a delayed-on time signal T3 of 9 minutes and a delayed-off time signal of 14 minutes.

FIG. 9F is a test for a defective clutch fan and has inputs to OR-gate 270 of UT, 195° F. and 180° F. and inputs to OR-gate 272 which are the same, i.e., UT, 195° F. and 180° F. There is a delayed-on signal T4 applied to base line 256 of 10 minutes and a delayed-off signal T6A applied to collector line 254 of 15 minutes for illumination of lamp F.

FIG. 9G is a test for a faulty electric fan in which the lamp G is illuminated and the OR-gate 272 receives temperature signals from the upper radiator hose 30 as inputs of UT, 180° F. and 195° F. while the OR-gate 272 receives temperature signals from the lower radiator hose 31 of 195° F., 180° F. and UT. In conducting this test, a vehicle's engine is run until the 195° F. temperature lights for both the top radiator hose 30 and bottom radiator hose 31 are reached lighting the lamp G. At that time, a switch 298 on the panel of box 40 is closed. If the indicator light G remains on and the coolant fan 35 (FIG. 1) is not running, then the fan and wiring should be checked for defects. There is a delayed-on signal T7 of 20 minutes for this test and a delayed-off signal T7A of 25 minutes for conducting the faulty electric fan test.

In FIG. 9H, if the lamp H is illuminated there is a defective head gasket. In this test, the OR-gate 270 has 160° F. and 180° F. temperature signal inputs from the upper hose 30 and a 160° F. input from the lower hose 31 via diode 296. The OR-gate 272 has a 160° F. input and 180° F. input from the lower hose 31. The lamp illuminates if the power transistor 252 has a delayed-on signal T4 of 10 minutes on the base line 256 and a delayed-off signal T6A of 15 minutes for the collector line 254.

Referring now to FIG. 9I, the lamp J illuminates if the water pump 22 (FIG. 1) is broken. For this test, the input temperature signals to the OR-gate 270' from the top hose 30 are UT, 232° F., 160° F. and 180° F. while the input temperature signals for the OR-gate 272' are 160° F., 195° F., 232° F. and UT. The delayed-on signal T1 occurs at 5 minutes and the delayed-off signal T1A occurs at 5 minutes.

Referring now to FIG. 9J, which the lamp J illuminates if there is a slipping water pump, for this test, the input temperature signals from the upper hose 30 which are applied to OR-gate 270' are UT,160° F., 195° F. and 180° F. while the temperature signals from the lower hose 31 applied to the OR-gate 272' are 160° F., 180° F., UT and 195° F. The time intervals in between a delayed-on time T5 of 12 minutes and a delayed-off time T6A of 15 minutes. In conducting this test, it is necessary to perform additional tasks because this type of overheating condition is intermittent. Accordingly, the vehicle's engine is revved up to 950 rpm and held for 1½ minutes. If, during this time, any one of the test indicator lights A–N flicker, then the water pump is slipping. The motorist's complaint should then be compared with a trouble-shooting section included in an analyzer's manual.

Referring to FIG. 9K, from time to time when a radiator 18 (FIG. 1) is replaced, the wrong radiator will be inserted into the vehicle. If this is the case, a lamp K will be illuminated. In the wrong radiator test, the OR-gate 270' which receives temperature signals from the top radiator hose 30 has inputs of UT, 195° F. and 180° F., while the OR-gate 272' has inputs from the bottom radiator hose of 185° F., 180° F. and 160° F. A delayed-on time T3 of 9 minutes is applied to the base line 254 of the power transistor 252 while delayed-off time signal T5A of 14 minutes is applied to the collector line 256.

Referring now to FIG. 9L, the lamp L is illuminated if there is a faulty radiator hose 30 or 31. Normally they should have been found by examining the hose prior to the test, but if it was not, then it is identified by conducting a procedure during the test wherein the engine is revved up to 1000 rpm and held for one minute and then revved up to 1500 rpm and held for 1½ minutes. The typical motorist complaint identifying this problem is that the vehicle does not overheat in traffic, but rather overheats while driving along at a substantially constant speed. In the circuit of FIG. 9L, the OR-gate 270' has temperature signal inputs from the upper hose 30 of 160° F., 195° F., 180° F. and UT while the OR-gate 272' has temperature signal inputs from the lower hose 31 of UT, 160° F., 195° F. and 180° F. The transistor 252 receives a delayed-on time signal T6 of 14 minutes and a delayed-off time signal T7A of 25 minutes for illumination of lamp L.

Referring now to FIG. 9M where the logic circuit for the test for a defective heater core or exchanger 24 (FIG. 1) is shown, the lamp M illuminates to indicate this condition. In this test, the OR-gate 270 receives temperature signals from the heater core input hose 26 of 195° F. and UT while the OR-gate 272 attached to the heater core output hose 28 has applied thereto temperature signals of 195° F., 180° F. and 160° F. The power transistor 252 has a delayed-On time T6 of 14 minutes on the base line 254 and a delayed-Off time T7A on collector line 256 of 25 minutes for illuminating lamp M. Disposed in the collector line 256 is a switch 299. In making this test, when the UT or 195° F. temperature indicator light M is on, then the switch 299 is turned closed.

Referring now to FIG. 9N, the panel light N is used to indicated a faulty heat control valve. In this test, the sensor cuff 42 is clamped on the top radiator hose 30 of FIG. 1 while the sensor clamp 44 is clamped on the hose 26 leading from the engine to the heater core 24. The OR-gate 270 is connected to the sensor clamp 42 and senses temperature signals at 195° F. and UT, while the OR-gate 272 is connected to the sensor clamp 44 and has input temperature signals of 195° F., 180° F. and 160° F. When the UT or 195° F. temperature indicator light is on, the switch 300 on the console 40 is closed to see if the light N extinguishes.

Disposed between the silicon control rectifiers 264 and the lamps A–N of each circuit is a line 301, which line is connected to supply a ground signal to the buzzer 64 of FIG. 4. Accordingly, when there is a fault, the buzzer 64 provides an audible alarm.

While separate logic circuits 250 are used for simplicity in order to accommodate overlapping time intervals for each test, it is within the scope of this invention to sort out the tests utilizing a computerized system in which substantially simultaneous processing of the time signals and temperature signals is accomplished utilizing multiplexing and signal storage. While lamps are used to indicate the occurrence of faults, it is also within the scope of this invention to configure the circuitry so as to use light emitting diodes, audible signals or combinations of light emitting diodes and audible signals. For example, instead of or in conjunction with an illumination such as that provided by lamp B, a voice indication may be utilized which says "Your radiator is repairable." Just how the defect or fault is indicated is optional. However, for the sake of simplicity, lamps are used are examples of indicators.

In order to minimize the chance that the system will malfunction or give false readings, it is advised that the radiator cap be tested with a reliable pressure tester and that the coolant level be even with the full mark on the radiator's external recovery tank. Moreover, the entire cooling system should be pressure checked for leaks and, if there are leaks, the leaks should be repaired. In order to ensure good contact with the upper radiator hose 30 and the lower radiator hose 31, they should be cleaned to remove dirt, grease, insects or any other foreign matter therefrom prior to attaching the sensor clamps 42 and 44. The heater and radiator hoses should then be checked for brittleness, fissures, perforations or softness, and the fan belt tension as well as fan belt condition should be checked. After these preliminary procedures are performed, then the analyzer 40 is connected and the cooling system checked as previously described.

From the foregoing description, one skilled in the art can easily ascertain the essential characteristics of this invention, and without departing from the spirit and scope thereof, can make various changes and modification of the invention to adapt it to various usages and conditions.

I claim:

1. A method for analyzing a cooling system of an internal combustion engine wherein the engine includes a radiator, a thermostat coupled to the engine, and inlet and outlet hoses connecting an inlet and an outlet of the radiator to the engine wherein the inlet and outlet hoses each have a heat level due to heated coolant flowing therethrough, the method comprising:

monitoring the heat level of the inlet radiator hose with a first sensor and the outlet radiator hose with a second sensor to produce separate temperature signals;

monitoring the first and second temperature signals to provide a series of discrete temperature outputs;

applying the discrete Temperature outputs to logic circuits;

applying timing signals for temperature outputs to the logic circuits;

determining in the logic circuits if the first and second temperature level signals have occurred during selected time intervals between delayed-on and delayed-off time signals indicative of particular faults in the cooling system, and, if so, providing outputs from the logic circuits indicative of a temperature/time condition of the cooling system of the engine; and applying the outputs of the logic circuits to an indicator which indicates a fault if the selected temperature level signals occur during the selected lime period.

2. The method of claim 1 wherein the radiator is identified as a repairable radiator when the temperature level sensed by the first sensor is at least about 195° F. and the temperature sensed by the second sensor is at least about 180° F. and the delayed-on time about 8 minutes and delayed-off time is about 12 minutes.

3. The method of claim 1 wherein the radiator is identified as an unrepairable radiator when the temperature level of the first sensor is at least about 195° F. wherein the temperature level detected by the second sensor is, at least about 195° F.

and wherein the delayed-on time is about 6 minutes and the delayed-off time is about 9 minutes.

4. The method of claim 1 wherein a clogged engine block is indicated when the temperature level sensed by the first sensor is at least about 180° F., the temperature level sensed by the second sensor is at least about 180° F. and wherein the delayed-on time is about 9 minutes and the delayed-off time is about 14 minutes.

5. The method of claim 1 comprising:
indicating a defective clutch fan when the temperature level sensed by the first sensor is at least about 180° F., and the temperature level sensed by the second sensor is at least about 180° F. and wherein the delayed-on time is about 10 minutes and the delayedoff time is about 15 minutes.

6. The method of claim 1 comprising:
indicating a defective electric fan if the temperature level sensed by the first sensor is at least about 180° F. and the temperature level sensed by the second sensor is at least about 180° F. and wherein the delayed-on time is about 20 minutes and the delayedoff time is about 25 minutes.

7. The method of claim 2 comprising:
indicating a defective head gasket when the temperature level sensed by the first sensor is about 160° F., 180° F. and the temperature level sensed by the second sensor is about 160° F. or about 180° F. and wherein the delayed-on time is about 10 minutes and the delayed-off time is about 15 minutes.

8. The method of claim 1 comprising:
indicating a broken water pump when the temperature level sensed by the first temperature sensor is at least about 160° F. and the temperature levels sensed by the second sensor is at least about 160° F. and wherein the delayed-on time is about 5 minutes and delayed-off time is about 5 minutes.

9. The method of claim 1 comprising:
indicating a slipping water pump when the temperature level sensed by the first sensor is at least about 160° F. and the temperature level sensed by the second sensor is at least about 160° F. and wherein the delayed-on time is about 12 minutes and the delayed-off time is about 14 minutes.

10. The method of claim 1 comprising:
indicating a radiator not suitable for the internal combustion engine has been installed when the temperature level sensed by the first sensor is at least about 180° F., and the temperature level sensed by the second sensor is at least about 160° F. and wherein the delayed-on time is about 10 minutes and the delayed-off time is about 14 minutes.

11. The method of claim 1 comprising:
indicating a faulty radiator hose when the temperature level sensed by the first sensor is at least about 180° F. and the temperature level sensed by the second sensor is at least about 160° F. and wherein the delayed-on time is about 14 minutes and delayed-off time is about 25 minutes.

12. The method of claim 1 further comprising:
sensing the heat level of a heater core inlet hose of the engine and sensing the heat level of a heater core outlet hose of the engine;
indicating a defective heater core of heat exchanger when the temperature level indicted by the first sensor is at least about 195° F., and wherein the second temperature level is at least about 160° F. and the delayed-on time is about 14 minutes and the delayed-off time is about 25 minutes.

13. The method of claim 1 comprising:
sensing the heat level of the inlet radiator hose and sensing the heat level of a heater core inlet hose of the engine,
indicating a defective heat controller or outlet valve when the first sensor senses temperature level of at least about 190° F. and the second sensor and senses a temperature level of at least about 160° F. and wherein the delayed-on time is about 14 minutes and delayed-off time is about 25 minutes.

14. The method of claim 1 comprising indicating a defective thermostat when the heat level sensed in the inlet radiator hose is at least about 160° F. and the heat level sensed in the outlet radiator hose is about 160° F. when there are delayed on times of 5 minutes.

15. An apparatus for identifying faults in a cooling system of an internal combustion engine wherein the cooling system includes a radiator, a thermostat coupled to the engine, an inlet radiator hose connecting the engine to the radiator and an outlet radiator hose connecting the radiator to the engine, the apparatus comprising:
a first sensor cable connected to the inlet radiator hose and a second sensor cable connected to the outlet radiator hose;
first and second linear amplifiers for measuring temperature, the linear amplifiers having discrete outputs indicative of selected temperature levels, the temperature measuring circuits being connected separately to the first and second sensor cables, respectively;
collators directly connected to the discrete outputs of the first and second temperature measuring circuits, each collator being connected to a cut-off;
an array of logic circuits connected to the collators for receiving outputs from the temperature measuring circuits; the logic circuits each comprising:
a first OR-gate connected by the collators to the outputs of a first group of linear amplifiers and a second OR-gate connected by the collators to selected outputs of a second group of linear amplifiers;
an AND-gate connected to the outputs of the first and second OR gates for having an output when both OR-gates have an output;
a transistorized switch connected to a timer in the timing circuit for enabling operation of an associated indicator during a selected time interval;
a switch connected to the indicator for energizing the indicator when the AND gate has an output;
a timer circuit connected to each of the logic circuits, the timer circuit starting and stopping time intervals in the logic circuits to provide a logic output indicative of a selected temperature/time condition identifying a fault; and
a plurality of indicators each associated with a separate fault, each indicator being connected to one of the logic circuits to indicate the occurrence of a fault in the cooling system.

16. The apparatus of claim 15, wherein the switch for enabling the indicator during a selected time interval is a power transistor which is connected through the indicator and the switch for energizing the indicator is a silicon-controlled rectifier connected to the output of the AND-gate which allows current to flow to ground form the power transistor through the indicator to energize the indicator.

17. The apparatus of claim 16, wherein the indicators are lamps.

* * * * *

UNITED STATES PATENT AND TRADEMARK OFFICE
CERTIFICATE OF CORRECTION

PATENT NO.     : 6,389,889 B1
DATED          : May 21, 2002
INVENTOR(S)    : Ford et al.

It is certified that error appears in the above-identified patent and that said Letters Patent is hereby corrected as shown below:

Column 12,
Line 42, change "Temperature" to -- temperature --.

Column 13,
Line 13, after "F." insert -- , --.
Lines 14 and 20, change "delayedoff" to -- delayed-off --.

Signed and Sealed this

Thirteenth Day of May, 2003

JAMES E. ROGAN
*Director of the United States Patent and Trademark Office*